(12) United States Patent  
Burdack et al.

(10) Patent No.: US 6,568,701 B1
(45) Date of Patent: *May 27, 2003

(54) PLATELET FIXED ON A BASE PLATE

(75) Inventors: Harald Burdack, Haibach (DE); Manfred Zerbe, Aschaffenburg (DE)

(73) Assignee: Takata-Petri AG, Aschaffenburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,395
(22) PCT Filed: Mar. 16, 1998
(86) PCT No.: PCT/DE98/00854
§ 371 (c)(1),
(2), (4) Date: Aug. 12, 1999
(87) PCT Pub. No.: WO98/42538
PCT Pub. Date: Oct. 1, 1998

(30) Foreign Application Priority Data

Mar. 24, 1997 (DE) .................................... 297 06 136 U

(51) Int. Cl.$^7$ .............................................. B60R 21/16
(52) U.S. Cl. ....................... 280/728.2; 280/731; 74/552
(58) Field of Search .............................. 280/731, 728.2, 280/750; 74/552

(56) References Cited

U.S. PATENT DOCUMENTS

| 3,378,972 | A | * | 4/1968 | Stanley ........................ 428/31 |
| 4,325,568 | A | * | 4/1982 | Clark et al. .............. 200/61.55 |
| 4,332,074 | A | * | 6/1982 | Auld et al. ................... 264/1.9 |
| 4,691,457 | A | * | 9/1987 | Peroni ........................ 40/1.5 X |
| 4,767,647 | A | * | 8/1988 | Bree ............................. 40/1.5 |
| 4,875,387 | A | * | 10/1989 | Henigue ................... 280/750 X |
| 5,180,187 | A | * | 1/1993 | Müller et al. ........... 280/731 X |
| 5,265,904 | A | * | 11/1993 | Shelton et al. .............. 280/731 |
| 5,369,232 | A | * | 11/1994 | Leonelli .................... 200/61.54 |
| 5,458,361 | A | * | 10/1995 | Gajewski ...................... 280/731 |
| 5,498,026 | A | * | 3/1996 | Eckhout ...................... 280/728.3 |
| 5,523,532 | A | * | 6/1996 | Leonelli et al. ........... 200/61.54 |
| 5,529,336 | A | | 6/1996 | Eckhout ...................... 280/728.3 |
| 5,685,056 | A | | 11/1997 | Fischer ........................ 29/512 |
| 5,698,276 | A | * | 12/1997 | Mirabitur ...................... 428/31 |
| 5,738,367 | A | * | 4/1998 | Zichichi et al. ........... 280/728.3 |
| 5,762,362 | A | * | 6/1998 | Kikuchi et al. .......... 280/731 X |
| 5,762,365 | A | * | 6/1998 | Worrell et al. ........... 280/750 X |
| 5,775,721 | A | | 7/1998 | Grout ........................... 280/727 |
| 5,913,534 | A | * | 6/1999 | Klingauf .................. 280/731 X |
| 6,000,814 | A | * | 12/1999 | Nestell et al. ............... 362/267 |
| 6,254,168 | B1 | * | 7/2001 | Crotty, III .................. 296/97.1 |
| 6,264,869 | B1 | * | 7/2001 | Notarpietro et al. ........ 264/247 |
| 6,322,100 | B1 | * | 11/2001 | Cuevas et al. ........... 280/728.2 |

FOREIGN PATENT DOCUMENTS

| DE | 94 02 922 | 7/1994 |
| DE | 295 07 890 | 9/1995 |
| DE | 296 07 536 | 9/1996 |
| DE | 296 07 951 | 9/1996 |
| DE | 296 17 721 | 3/1997 |
| EP | 0 742 123 | 11/1996 |
| GB | 2 300 159 | 10/1996 |

* cited by examiner

Primary Examiner—Paul N. Dickson
Assistant Examiner—Toan To
(74) Attorney, Agent, or Firm—Foley & Lardner

(57) ABSTRACT

A platelet, that is fixed on a base plate, has particularly narrow three-dimensional sections and is chiefly intended to be used as a cover cap for driver air bag modules. The platelet exhibits at least one protrusion on its back side. The protrusion serves as an indicator for the power direction in which to solder the platelet to the base plate. The configuration of the platelet provides the advantage that even filigree platelets with enhanced three-dimensional effects can be soldered securely on the base plate, thus avoiding overheating of and damage to the platelet. The secure connection ensures that the platelet does not come off from the cover cap of an air bag in case of a crash and hit the occupant.

15 Claims, 2 Drawing Sheets

PLATELET FIXED ON A BASE PLATE

FIELD OF THE INVENTION

The invention relates to a platelet fixed on a base plate.

BACKGROUND OF THE INVENTION

Platelets are used in various different forms for characterizing and decorating products, e.g. in automobiles. It is also particularly customary to provide the cover caps of driver airbags with a platelet.

An arrangement is known from DE 296 07 951 U1 wherein the platelet, which is referred to as an emblem, is fixed on a small plate. The emblem is either formed by enamelling the surface of the small plate, or the emblem is placed on a support which is stuck onto the small plate.

This arrangement is particularly suitable for fixing flat surface type emblems where a large contact surface is available. This arrangement is, however, not suitable for platelets which have three-dimensional narrow sections so that there is hardly any adhesive surfaces available.

SUMMARY OF THE INVENTION

The object of the invention is to fix a platelet having three dimensional narrow sections securely onto a backing support.

A platelet, fixed on a base plate, more particularly a platelet having three dimensional narrow sections (or webs), and more particularly for use on cover caps of driver airbag modules, is characterized, according to the invention, in that the platelet has on the reverse side at least one protrusion as a power direction indicator for a welded connection with the base plate. The protrusion preferably has a cross-section tapering acutely towards the base plate. The protrusion extends in a line corresponding to the platelet structure. The line of the protrusion can be both continuous and broken.

The design of the platelet has the advantage that even filigree platelets with an enhanced three dimensional effect can be securely connected by welding to a base plate by means of the protrusions without the platelet becoming overheated and thereby damaged. The secure connection ensures that the platelet does not tear away from the cover cap of an airbag in the event of a crash. The tearing platelet could endanger the occupant.

Achieving a satisfactory welded connection by means of a known welding process is possible with a smooth surface of the base plate. In order to prevent welded material from protruding visibly at the sides in the case of the platelet having narrow webs, it can be advantageous if a base plate groove is associated with each protrusion. The groove should have a horizontal base surface with side faces running perpendicular thereto and preferably with an at least approximately rectangular cross-section.

The base plate and platelet preferably consist of the same material, more preferably plastic.

On the back of the base plate there is preferably at least one fastening dome for fixing the base plate on a backing support. To equip the cover cap of an airbag module with a platelet, the base plate is connected to the cover cap of the airbag module by welding by means of the fastening dome.

The plastic platelet is surface coated and provided with a scratch-resistant protective lacquer to produce the desired surface.

BRIEF DESCRIPTION OF THE DRAWINGS

The invention will now be explained with reference to an embodiment shown in the drawings in which:

FIG. 1a is a plan view of a reverse side of the platelet shown in FIG. 1 with protrusions which run along lines corresponding to the path of sections 6;

DETAILED DESCRIPTION OF THE PREFERRED EMBODIMENTS

Figure 1:
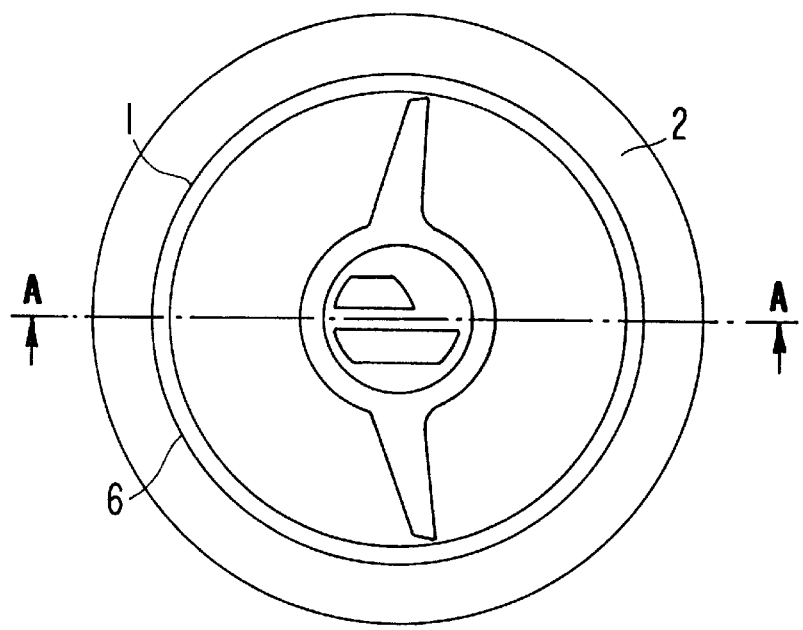
FIG. 1 is a plan view of a base plate with platelet.
Figure 2:
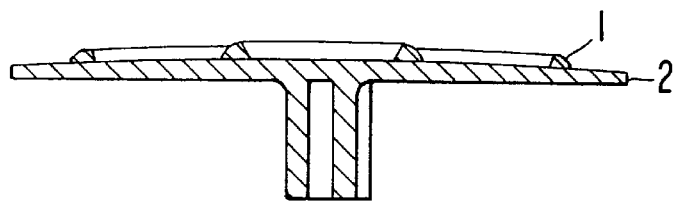
FIG. 2 is a section through FIG. 1 seen in the direction of arrow A—A.
Figure 3:
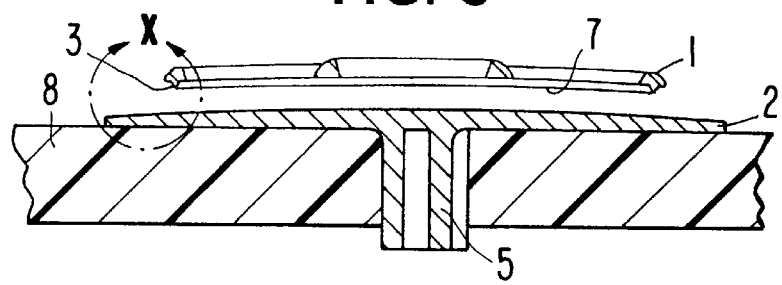
FIG. 3 shows the section according to FIG. 2 with the platelet and base plate shown separately.
Figure 4:
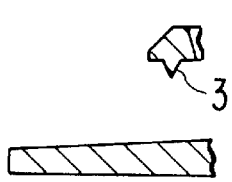
FIG. 4 shows a detail X of FIG. 3.

The platelet 1 shown in FIG. 1 in plan view is to be fixed on the associated base plate 2. The platelet is shown on an enlarged scale, i.e. sections (or webs) 6 of the platelet are even narrower than shown there. It can be seen from FIG. 2 that the platelet is three-dimensional. It can be seen from FIGS. 3 and 4 that the platelet is adapted to the back of the surface of the base plate 2 and has protrusions 3. The protrusions run along lines corresponding to the path of sections 6 on a reverse side 7 of the platelet, as shown in FIG. 1. As can be seen from FIGS. 3 and 4, the protrusion has a cross-section tapering towards the base plate so that it contacts the base plate along a line.

The connection of the platelet with the base plate is produced by placing the platelet on the base plate, whereby the protrusion contacts the base plate along a line. In addition, pins and holes can be provided (not shown), for centering purposes, as the platelet is fitted on the base plate. During the subsequent welding process, by means of a known welding method, the transfer of heat only takes place through the protrusions so that the platelet is welded at the protrusions to the base plate. Welding in the area of the protrusions ensures a good quality connection without the filigree structures of the platelet being affected. The platelet can be surface treated together with the base plate. Both surfaces can, however, be surface treated separately prior to welding so that they can have different surface structures without a problem.

Figure 5:
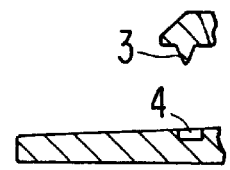
FIG. 5 shows a detail of an embodiment wherein the protrusion is associated with an indentation in the base plate.
Figure 6:
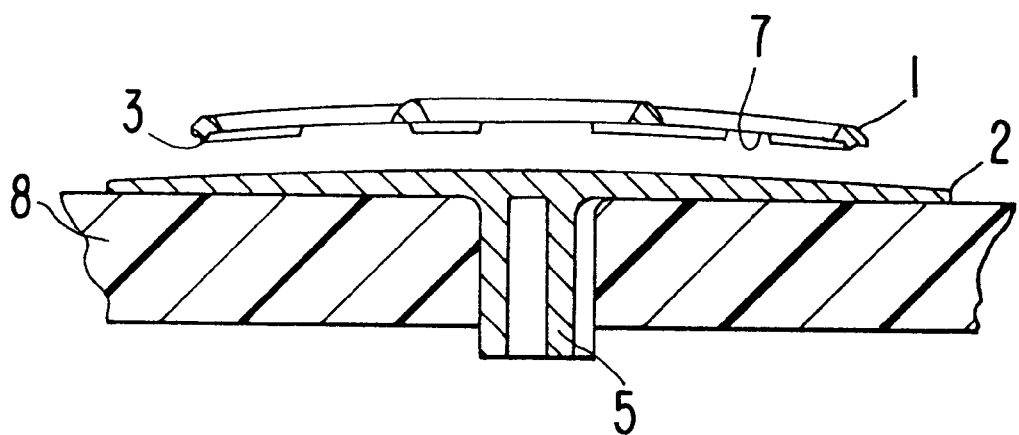
FIG. 6 is a sectional view similar to that shown in FIG. 3, but which illustrates the line of the protrusion which projects down from the reverse side of the platelet, being discontious or interrupted.

With the embodiment of FIG. 5, the protrusion 3 of the platelet is associated with a groove 4 on the base plate 2. It can be seen that the groove 4 has an approximately rectangular cross-section. In this case the platelet, therefore, also only lies on the base plate 2 by the protrusions prior to welding with the base plate. The groove which is provided for each protrusion allows problem-free welding of platelets with narrow webs 6, without having the welding material protrude visibly at the sides.

The base plate 2 is provided on an underneath side with a fixing dome 5 which is injection molded on the base plate 2. By means of this dome, the base plate 2 can be connected by known welding technology or other thermal method to a backing support, e.g. to a cover cap 8a of a module that includes an airbag 8.

What is claimed is:

1. An assembly comprising:
   an airbag cover;
   a base plate with a projection secured to the cover;
   an annular member with at least one protrusion extending toward the base plate; and at least one heat welded connection between the protrusion and the base plate.

2. The assembly according to claim 1 wherein the protrusion has a cross-section tapering acutely towards the base plate.

3. The assembly according to claim 1 wherein the protrusion runs along a line corresponding to the contour of the platelet.

4. The assembly according to claim 3 wherein the line of the protrusion is interrupted.

5. The assembly according to claim 3 wherein the line of the protrusion is uninterrupted.

6. The assembly according to claim 1 wherein the base plate includes a groove for receiving the protrusion.

7. The assembly according to claim 6 wherein the groove has a horizontal base surface.

8. The assembly according to claim 6 or 7 wherein the groove has a substantially rectangular cross-section.

9. The assembly according to claim 1 wherein the base plate comprises a material and the annular member comprises the same material.

10. The assembly according to claim 1 wherein the base plate and the annular member are made of plastic.

11. The assembly according to claim 1 wherein the annular member is surface coated and provided with a scratch resistance protective lacquer.

12. The assembly according to claim 1 wherein the base plate includes a back side and at least one fixing dome provided on the back side of the base plate for fixing the base plate on a support backing.

13. The assembly according to claim 1 wherein the projection connected to the airbag cover by welding.

14. The assembly according to claim 1 wherein the annular member has three-dimensional narrow sections.

15. The assembly according to claim 1 wherein the protrusion has a cross-section tapering acutely towards the base plate to a relatively narrow point at the a connection with the base plate.

* * * * *